United States Patent

Pham et al.

(10) Patent No.: US 9,635,428 B2
(45) Date of Patent: *Apr. 25, 2017

(54) SYSTEM AND METHODS TO TEST MEDIA DEVICES

(75) Inventors: Hung John Pham, Cedar Park, TX (US); John Clayton Clark, IV, Austin, TX (US); Shane M. Elliott, Fort Worth, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 1419 days.

This patent is subject to a terminal disclaimer.

(21) Appl. No.: 12/959,625

(22) Filed: Dec. 3, 2010

(65) Prior Publication Data

US 2012/0143359 A1 Jun. 7, 2012

(51) Int. Cl.
H04N 21/482 (2011.01)
H04N 21/6338 (2011.01)
H04N 21/6377 (2011.01)

(52) U.S. Cl.
CPC ....... H04N 21/482 (2013.01); H04N 21/6338 (2013.01); H04N 21/6377 (2013.01)

(58) Field of Classification Search
CPC .... H04N 17/004; H04N 17/04; H04N 21/436; H04N 21/482; H04N 21/6377; H04N 21/6338
USPC ............................... 725/110; 348/14.08, 181
See application file for complete search history.

(56) References Cited

U.S. PATENT DOCUMENTS

| | | | | |
|---|---|---|---|---|
| 5,883,621 A * | 3/1999 | Iwamura | ........... | H04L 12/40078 348/E5.103 |
| 2007/0157274 A1* | 7/2007 | Chiu | ...................... | H04N 17/04 725/107 |
| 2007/0285504 A1* | 12/2007 | Hesse | ........................ | 348/14.08 |
| 2009/0089854 A1* | 4/2009 | Le | .......................... | H04N 17/00 725/139 |
| 2009/0172757 A1* | 7/2009 | Aldrey | .................... | H04N 7/165 725/110 |
| 2009/0292375 A1* | 11/2009 | Thompson et al. | ............ | 700/81 |
| 2009/0320077 A1* | 12/2009 | Gazdzinski | ........ | H04N 7/17318 725/62 |

(Continued)

FOREIGN PATENT DOCUMENTS

WO  WO 9723096 A1 *  6/1997  ....... G08B 13/19645
WO  WO 2011047024 A1 *  4/2011  ......... H04N 7/17318

*Primary Examiner* — Benjamin R Bruckart
*Assistant Examiner* — Tien M Nguyen
(74) *Attorney, Agent, or Firm* — Toler Law Group, PC

(57) ABSTRACT

A particular method includes receiving, at a control server from a user terminal, input selecting at least one media device that generates media output in an output format. The method includes sending a signal from the control server to a media switch to couple an output of the at least one media device to the user terminal. The media output of the at least one media device is sent to the user terminal in the output format when the output is coupled to the user terminal. The method includes receiving, at the control server from the user terminal, a command to be performed by the at least one media device. The method also includes sending command data from the control server to one or more controllers associated with the at least one media device. The at least one media device is controlled based on the command data to perform the command.

20 Claims, 6 Drawing Sheets

(56) References Cited

U.S. PATENT DOCUMENTS

2012/0140081 A1* 6/2012 Clements ............... H04N 17/04
348/181

* cited by examiner

SYSTEM AND METHODS TO TEST MEDIA DEVICES

FIELD OF THE DISCLOSURE

The present disclosure is generally related to media device testing systems and methods.

BACKGROUND

Media devices may process media content, may run applications, and may send output to display devices. A service provider that provides media content to customers may test new types of media devices and new applications for media devices before the media devices and the applications are made available to customers. Also, particular media devices that are returned from customers due to problems with the particular media devices may be tested to diagnose defects so that the defects can be fixed or otherwise addressed to eliminate occurrence in other media devices.

A tester of media devices may have a number of media devices to be tested. The tester may use a remote control device to send commands to each media device being tested and may observe the results on corresponding display devices. The tester may need to repeat the same actions many times to test a large number of media devices.

DETAILED DESCRIPTION

A testing system may enable a user to test a set of media devices located in a test facility. The user may use a user terminal to choose the set of media devices. Output for the set of media devices may be provided by a media switch to the user terminal for display on a display device. The media switch may provide a video portion of the output to the user terminal as composite video. The output may be displayed on the display device coupled to the user terminal as an array of media outputs from the corresponding media devices. The user may enter one or more commands for the set of media devices at the user terminal. The testing system allows the commands to be converted to infrared (IR) commands that are transmitted to the set of media devices. Transmitting the IR commands to the set of media devices simulates viewers using remote control devices to control the media devices.

In a particular embodiment, a method includes receiving, at a control server from a user terminal, input selecting at least one media device that generates media output in an output format. The method includes sending a signal from the control server to a media switch to couple an output of the at least one media device to the user terminal. The media output of the at least one media device is sent to the user terminal in the output format when the output is coupled to the user terminal. The method includes receiving, at the control server from the user terminal, a command to be performed by the at least one media device. The method also includes sending command data from the control server to one or more controllers associated with the at least one media device. The at least one media device is controlled based on the command data to perform the command.

In a particular embodiment, a user terminal includes a processor and a memory accessible to the processor. The memory includes instructions executable by the processor to receive a first input selecting at least one media device. The memory includes instructions executable by the processor to send a signal to a control server in response to the first input. The control server causes an output of the at least one media device to be sent to the user terminal in an output format of the at least one media device in response to the signal. The memory includes instructions executable by the processor to receive a second input specifying a command to be performed by the at least one media device. The memory also includes instructions executable by the processor to send information identifying the command to the control server. In response to the information, the control server sends command data to an address associated with the at least one media device and the at least one media device is controlled based on the command data to perform the command.

Figure 1:
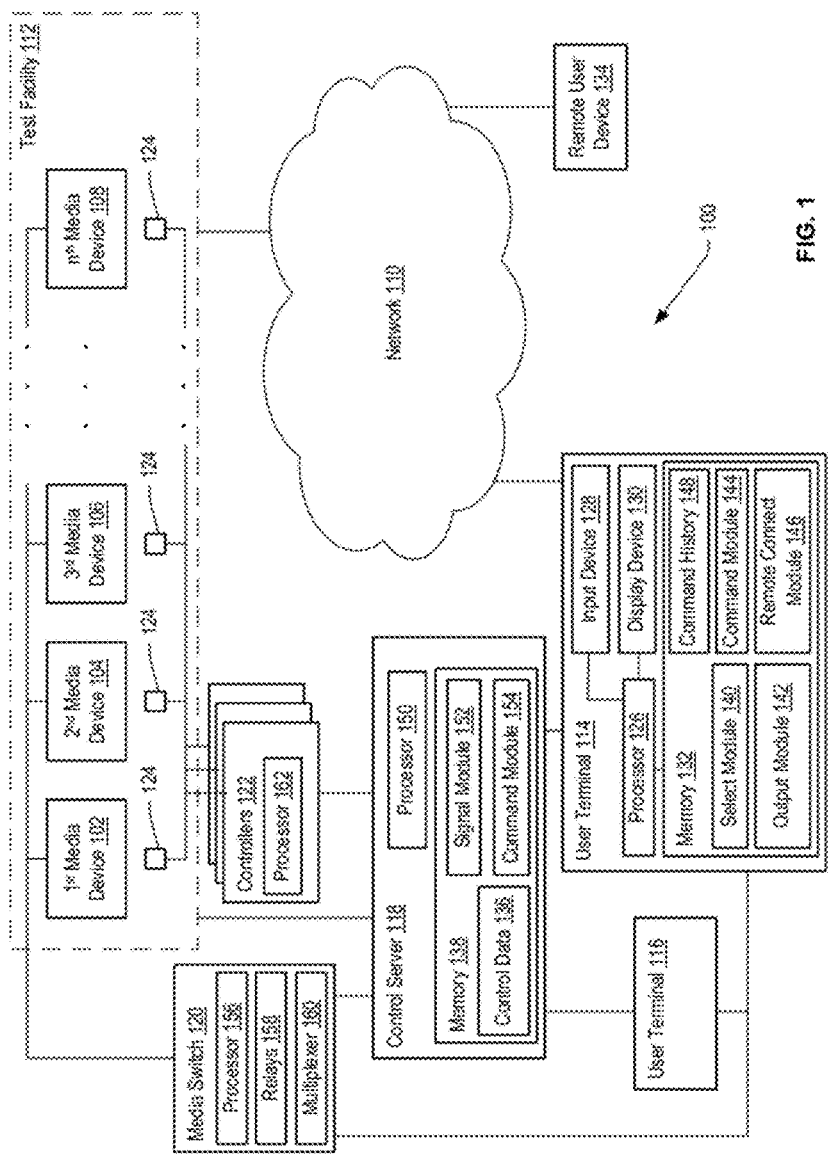
FIG. 1 is a block diagram of an embodiment of a system to test media devices.

FIG. 1 is a block diagram of a particular embodiment of a system 100 to test media devices 102-108. The media devices 102-108 may be set top box devices or other devices that receive media content from a service provider via a network 110. The service provider may be a satellite service provider, a cable service provider, an Internet Protocol Television (IPTV) service provider, another service provider, or combinations thereof. The media content may include, but is not limited to, television programming, game content, internet content, audio programming, video-on-demand content, pay-per-view content, or combinations thereof. A worker may connect the media devices 102-108 to be tested to test stations in a test facility 112.

A user who is to test at least some of the media devices 102-108 may select a set of one or more of the media devices 102-108 using a user terminal 114 of one or more user terminals 114, 116. When the user selects the set, the user terminal 114 may communicate with a control server 118. The control server 118 may send a signal to a media switch 120 to have the media switch 120 connect output from each media device of the set to the user terminal 114. The control server 118 may also associate the media devices of the set with the user terminal 114 so that only the user terminal 114 can send commands to the media devices of the set. Allowing only commands sent via the user terminal 114 enables the user to know that the output presented to the user terminal 114 for the set is a result of the commands enacted by the user and not from another source. When the user enters a command for the set at the user terminal 114, the user terminal 114 may send command data to the control server 118. The control server 118 may send the command data to particular controllers of a plurality of controllers 122. The particular controllers may be identified by the control server 118 as being associated with the set of media devices. The particular controllers may convert the command data to an infrared (IR) signal and send the IR signal to control signal output devices 124 that transmit the IR signal to the media devices of the set. The control signal output devices 124 may be IR transmitters (e.g., IR blasters).

The test facility 112 may include a number of test stations. Each test station may include one or more input connections for the media devices 102-108 to be tested. The one or more input connections may allow the media devices 102-108 to receive media content from the network 110. The test facility 112 may include at least one router, at least one local area network device, at least one modem (e.g., at least one digital subscriber line (DSL) modem or at least one cable modem), at least one residential gateway, other communication facilitators, or combinations thereof to provide media content obtained from the network 110 to the media devices 102-108 coupled to the test stations by the one or more input connections.

Each test station may also include one or more output connections for the media devices 102-108 that are to be tested. The output connections may couple the media devices 102-108 to the media switch 120. The media switch 120 may receive audio output and video output from each of the media devices 102-108 coupled to test stations in the test facility 112. Each test station may also include one of the control signal output devices 124. Each control signal output device 124 may be coupled to a port of a particular controller of the controllers 122.

The user may use the user terminal 114 to select a set of one or more of the media devices 102-108 coupled to test stations in the test facility 112. The user may also use the user terminal 114 to send commands to the particular media devices of the set or to one or more particular media devices of a subset of the set. The user terminal 114 may include a processor 126. The processor 126 may be coupled to at least one input device 128, at least one display device 130, and at least one memory 132. The at least one input device 128 may be used by the user to provide input to the user terminal 114. The at least one input device 128 may include, but is not limited to, a touch screen, a mouse, a keyboard, a remote user device 134 coupled to the user terminal 114 by the network 110, or combinations thereof. The at least one display device 130 may display a first user interface that enables the user to choose the set of media devices to be tested from the media devices 102-108 coupled to test stations in the test facility 112, a second user interface to show video output of the particular media devices of the set (e.g., the user interface depicted in FIG. 2), a third user interface to allow the user to enter commands for the set or a subset of the set (e.g., the user interface depicted in FIG. 3), or combinations thereof. For example, the user terminal 114 may be coupled to a first display device and a second display device. The first display device may display the first user interface, the second user interface, or both. The second display device may display the third user interface.

The first user interface may present a listing of the test stations in the test facility 112 and an identifier of a particular media device in the each of the test stations. Data for the listing may be obtained from control data 136 in a memory 138 of the control server 118. The user may use the at least one input device 128 to select one or more entries in the listing. An entry in the listing may not be selectable when the media device identified in the entry is allocated for control to another device (e.g., to user terminal 116). The first user interface may allow the user to release a particular media device allocated to the user terminal 114. The first user interface may also allow the user to specify that the media switch 120 send the output from one or more selected media devices allocated for control to the user terminal 114 to another device (e.g., to user terminal 116) in addition to sending the output to the user terminal 114.

The at least one memory device 132 may include instructions executable by the processor 126 to test the media devices 102-108 coupled to test stations of the test facility 112. For purposes of description, the instructions are illustrated in FIG. 1 as organized in functional modules to perform particular tasks. The functional modules may include a select module 140, a command module 144, an output module 142, and a remote connect module 146.

The select module 140 may be executed by the processor 126 to generate the first user interface, to receive user input from the at least one input device 128 associated with the first user interface, and to send at least one signal to the control server 118 based on the received input. The at least one signal includes an identifier of each selected media device from the listing and information identifying an action for the one or more selected media devices (e.g., allocate the one or more selected media devices for control by the user terminal 114, remove the allocation of control by the user terminal 114 for the one or more selected media devices, and have the output of the one or more selected media devices sent to a selected device).

The output module 142 may be executed by the processor 126 to generate the second user interface and to receive output from the media switch 120 from particular media devices identified in the control data 136 as allocated for control by the user terminal 114. The user may input commands at the user terminal 114 via the at least one input device 128 that specify the layout of the third user interface. The video output received by the user terminal 114 may be sent to the user terminal 114 as component video rather than in a digital format using Internet Protocol (IP) packets. The output module 142 may receive an audio output for each of the particular media devices identified in the control data 136 as allocated for control by the user terminal 114. The user terminal 114 may mute all of the audio output as a default setting. The user may enter input via the at least one input device 128 to choose to hear the audio associated with a selected media output shown in the third user interface. In some embodiments, the user terminal 114 may be able to receive the media output of a limited number of the media devices 102-108 (e.g., the media output of 16 media devices or the media output of 24 media devices).

The command module 144 may be executed by the processor 126 to generate the third user interface, to receive user input from the at least one input device 128 associated with the second user interface, to store user input of commands in a command history 148 of the at least one memory 132, and to send command information corresponding to the user input to the control server 118. The command history 148 may store each command entered by the user, may store several commands as a command set, may store information associating particular command sets with one or more particular media devices as tasks, may store information identifying one or more tasks as a task group, may store information identifying one or more task groups as a job, or any combination thereof. The command information sent to the control server 118 may identify at least one particular media device and the command or commands to apply to the at least one particular media device. The command or commands may include, but are not limited to, a command to power on the at least one particular media device, a command to power off the at least one particular media device, a channel change request, a menu selection, a command to access particular media content, a command to change a playback property of media content played by the at least one particular media device, a command to record media content, a command to start an application, and combinations thereof.

The remote connect module 146 may facilitate communication of data to and from the remote user device 134. The remote user device 134 may be a home computer, laptop computer, or other computing device used by the user from a remote location. The remote connect module 146 may enable the user terminal 114 to send the output of the output module 142 to the remote user device 134 as IP packets.

The user may use the user terminal 116 instead of the user terminal 114. The user terminals 114, 116 and other user terminals may be located in a control room or studio associated with the test facility 112 or at various other locations. In some embodiments, a particular user terminal may only be used to control a particular set of test stations in the test facility 112. In other embodiments, no restrictions are placed on which test stations particular user terminals can control.

The control server 118 may receive input from the user terminals 114, 116. The control server 118 may include a processor 150 that may access the memory 138. The memory 138 may include the control data 136 and instructions executable by the processor 150. For purposes of description, the instructions are illustrated in FIG. 1 as organized in functional modules to perform particular tasks. The functional modules may include a signal module 152 and a command module 154.

The control data 136 may include an entry or record for each test station of the test facility 112. Each entry may include an identifier of the particular test station, an identifier of a particular media device coupled to the particular test station, a particular user terminal that is allocated to control the particular media device, and an identifier of any other user terminals that are to receive the media output of the particular media device in addition to the particular user terminal. The control server 118 may be coupled to the test facility 112. When a particular media device is first coupled to a particular test station, the entry in the control data 136 corresponding to the particular test station may be updated (automatically or manually) to include the identifier for the particular media device (e.g., a Media Access Control (MAC) address of the media device or other unique identifier), to reflect that the particular media device is not allocated to a particular user terminal, and to reflect that no additional media devices are to receive media output from the particular media device. When a particular media device is uncoupled from a particular test station, the entry in the control data corresponding to the particular test station may updated (automatically or manually) to remove the identifier of the particular media device, to reflect that the test station is not allocated for control to a particular user terminal, and to reflect that no user terminals are to receive output from the particular test station.

The control data 136 for each test station may also identify a network address of a particular controller of the controllers 122 associated with the test station and a port number of the particular controller to which the control signal output device 124 for the test station is coupled. This information (i.e., controller addresses and port numbers corresponding to the control signal output devices 124) allows commands received by the control server 118 for particular media devices to be directed to the particular media devices.

The signal module 152 may be executed by the processor 150 when the control server 118 receives a signal from a particular user terminal (e.g., the user terminal 114) that includes a request to alter where output from the media switch 120 is to be directed. The signal may identify one or more particular media devices by referring to the test station identifiers where the one or more particular media devices are located. When the signal includes a request to allocate control of one or more of the media devices 102-108 to the particular user terminal, the signal module 152 may cause the processor 150 to change the control data 136 to reflect the allocation of control of the one or more particular media devices with the particular user terminal. The signal module 152 may also cause the processor 150 to send a signal to the media switch 120 to direct media output received by the media switch 120 from the one or more particular media devices to the particular user terminal. A processor 156 of the media switch 120 may user relays 158, a multiplexer 160, or both to direct the appropriate media output to the particular user terminal.

When the signal received by the control server 118 includes a request to remove the allocation of control of one or more particular media devices from the particular user terminal, the signal module 152 may cause the processor 150 to update the appropriate entries in the control data 136. The signal module 152 may also cause the processor 150 to send a signal to the media switch 120 to have the processor 156 of the media switch 120 adjust the relays 158, the multiplexer 160, or both to stop directing the output of the one or more particular media devices to the particular user terminal.

When the signal received by the control server 118 includes a request to send (or stop sending) media output from one or more particular media devices to one or more devices in addition to the particular user terminal allocated to control the one or more particular media devices, the signal module 152 may cause the processor 150 to update the appropriate entries in the control data 136. The signal module 152 may also cause the processor 150 to send a signal to the media switch 120 to have the processor 156 of the media switch 120 adjust the relays 158, the multiplexer 160, or both to direct (or stop directing) the output of the one or more particular media devices to the additional one or more devices.

The command module 154 may be executed by the processor 150 when the control server 118 receives command information from a particular user terminal (e.g., the user terminal 114) that identifies one or more commands that are to be implemented by one or more of the media devices 102-108. The command information may identify one or more particular media devices (e.g., by referring to the test station identifiers where the one or more particular media devices are located). The command module 154 may cause the processor 150 to access the control data 136 to determine network addresses for the control signal output devices 124 associated with the one or more particular media devices. The network address of a particular control signal output device may identify a particular controller of the controllers 122 and a port number of the particular controller that corresponds to the particular control signal output device. The command module 154 may cause the processor 150 to send the requested commands to appropriate control signal output devices 124 via corresponding network addresses.

Each controller 122 may include a processor 162 that directs received commands to the appropriate control signal output devices 124. The control signal output devices 124 may convert the commands received as IP packets into one or more infrared (IR) commands. The one or more IR commands may be transmitted to the one or more particular media devices that are to implement the one or more identified commands.

The system 100 may allow the user to test a set of the media devices 102-108 located in the test facility 112. The user may use a first user interface shown on the user terminal 114 to choose the set of particular media devices. Output for the set of particular media devices is provided by the media switch 120 to the user terminal 114 for display on the at least one display device 130. The media switch 120 provides a video portion of the output to the user terminal 114 as composite video. The output may be displayed on the at least one display device 130 via a second user interface as an array of media outputs from the corresponding media devices. The user may enter one or more commands for the set of media devices at the user terminal 114 via the third user interface. The system 100 may allow the commands to be converted to infrared (IR) commands that are transmitted to the set of media devices via control signal output devices 124. Transmitting the IR commands to the set of media devices may simulate viewers using remote control devices to control the media devices. The system 100 may eliminate the need for each of the media devices 102-108 to be coupled to a display device. The system 100 may also reduce the repetition of entries by the user to implement commands to the set of particular media devices since the user does not have to repeat the commands for each of the particular media devices.

Figure 2:
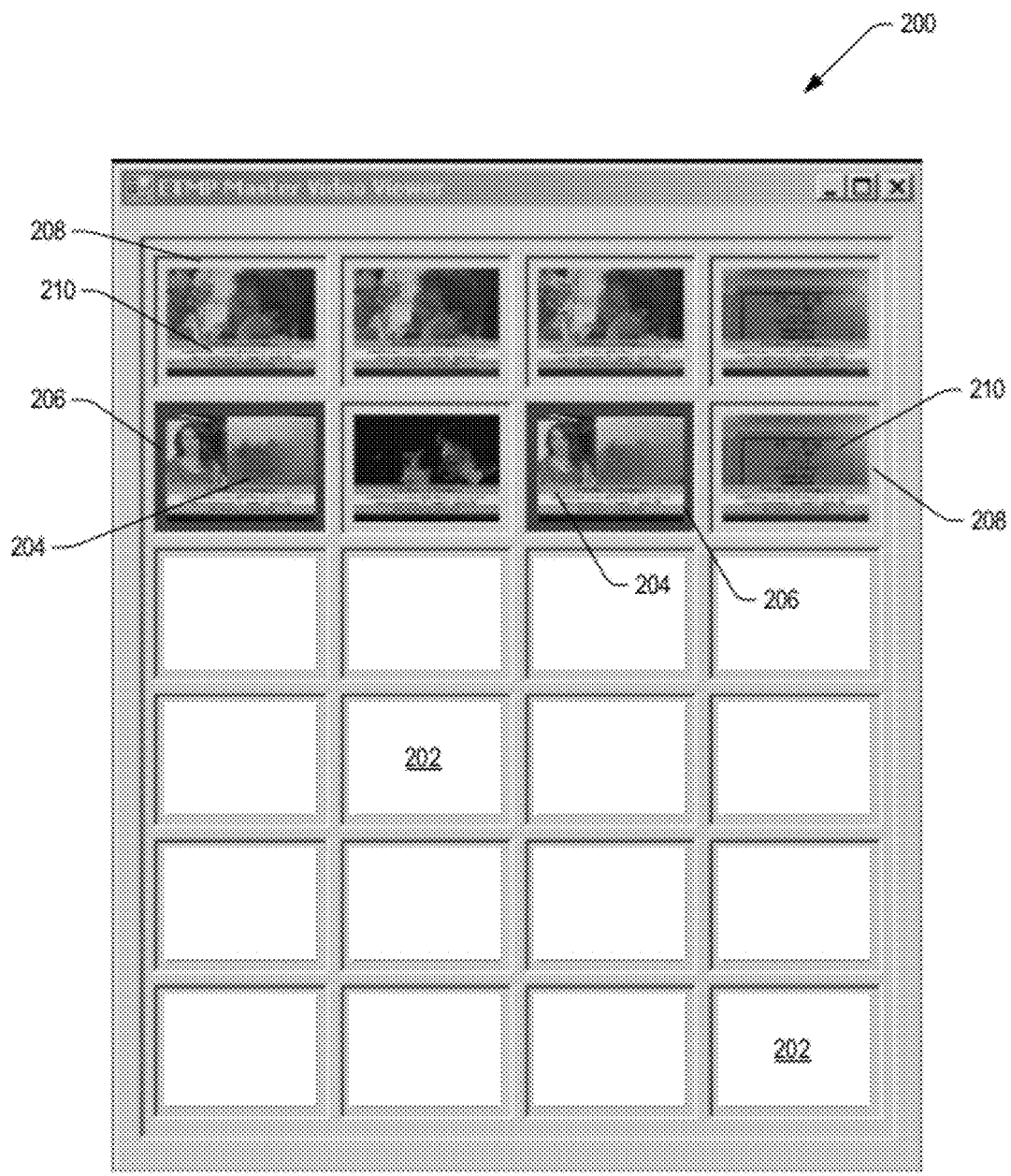
FIG. 2 is a representation of a first particular embodiment of a user interface used to test media devices.

FIG. 2 is a representation of a first particular embodiment of a user interface 200 used to test media devices. The user interface 200 may be shown on a display device (e.g., on the at least one display device 130 depicted in FIG. 1). The user interface 200 may show an array of thumbnail views 202 of media output from media devices selected by a user. The array shown in FIG. 2 has twenty-four thumbnail views 202, eight of which are currently showing media content selected by the user. The user may use one or more input devices to select the thumbnail views 202 and enter commands related to the thumbnail views 202. For example, the user may use a mouse to double click on a particular thumbnail view to enlarge the particular thumbnail view, and the user may press an escape key to return to the view of the array. As another example, the user may right click on a particular thumbnail. A dropdown menu may be presented that allows the user to have the audio from the media device corresponding to the particular thumbnail played or muted.

The user may select one thumbnail view 202 that is showing media content, a subset of the thumbnail views 202 showing media content, or all of the thumbnail views 202 that are showing media content using the one or more input devices. Selected thumbnails 204 may be emphasized. For example, borders 206 of the selected thumbnails 204 may be a different color than borders 208 of unselected thumbnails 210. Commands entered via another user interface (e.g., the user interface depicted in FIG. 3) may be implemented at the media devices corresponding to the selected thumbnails 204.

Figure 3:
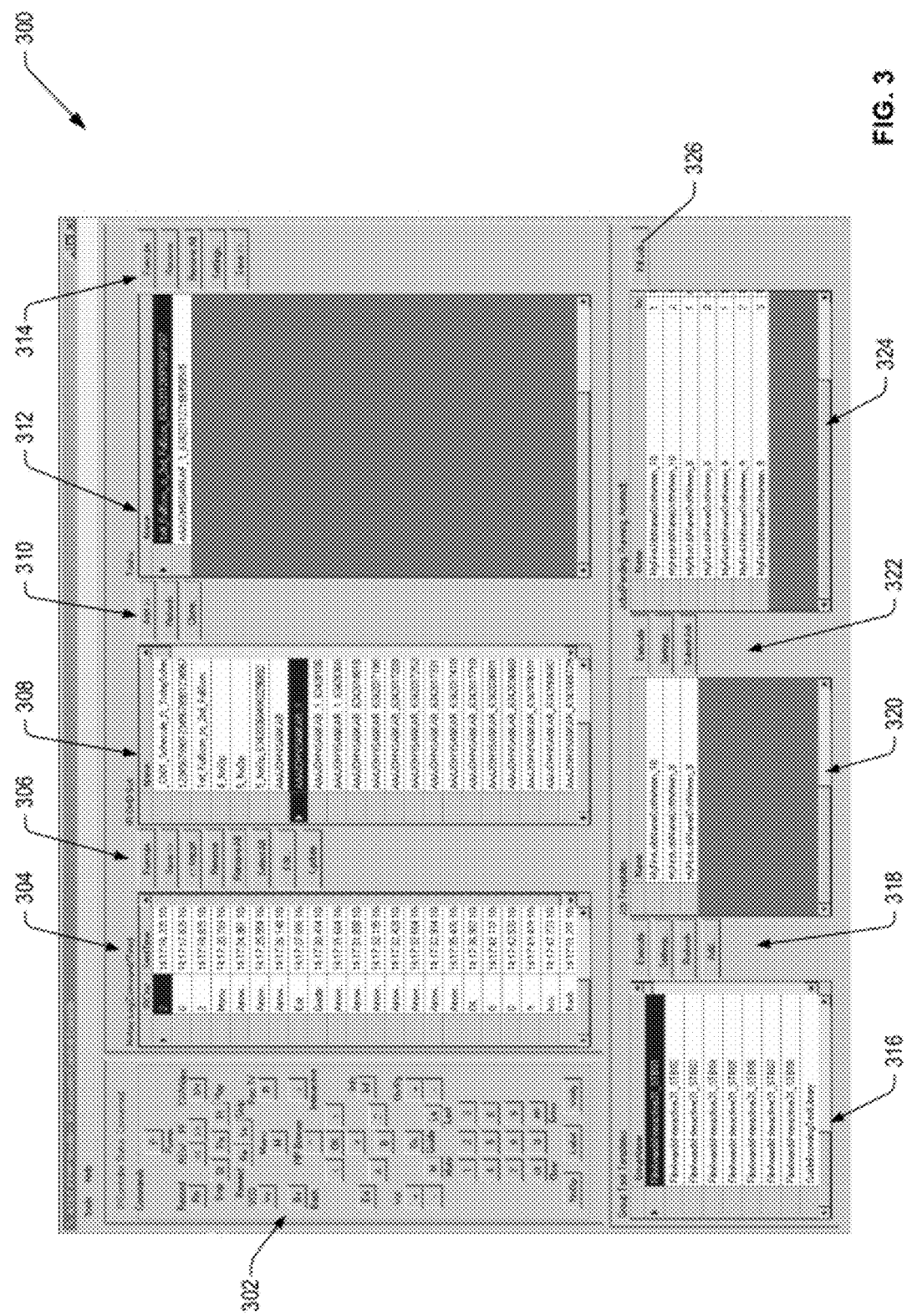
FIG. 3 is a representation of a second particular embodiment of a user interface used to test media devices.

FIG. 3 is a representation of a second particular embodiment of a user interface 300 used to test media devices. The user interface 300 may be shown on a display device (e.g., on the at least one display device 130 depicted in FIG. 1). The user interface 300 may include a remote control representation 302. When a user uses one or more input devices to press a button of the remote control representation 302, a command corresponding to the pressed button may be sent to one or more media devices (e.g., media devices corresponding to selected thumbnail views 204 in FIG. 2). The result of the command may be shown in real time on the selected thumbnail views. For example, when the user presses the "2" on the remote control representation 302, a "2" appears in the outputs of media devices being tested.

The user interface 300 may include a history log 304 and command buttons for the history log. The history log 304 may include a listing of the buttons pressed on the remote control representation 302. The user interface 300 may also include a set of command buttons 306 that affect selected entries in the history log 304.

The user may use the one or more input devices to highlight a set of commands in the history log 304. The user may save the highlighted set as a command set. Saved command sets may be shown in a command set window 308. The user interface 300 may also include a set of command buttons 306 for entries selected in the command set window 308.

The user may highlight one or more command sets in the command set window 308. The user may save the highlighted set as task. Saved tasks may be shown in a tasks window 312. The user interface 300 may also include a set of command buttons 314 for entries selected in the tasks window 312.

The user may highlight one or more tasks in the tasks window 312. The user may save the highlighted set as a group task. Saved group tasks may be shown in a group task templates window 316. The user interface 300 may also include a set of command buttons 318 for entries selected in the group task templates window 316.

The user may highlight one or more group tasks in the group task templates window 316. The user may save the highlighted group tasks as a job. Saved jobs may be shown in a job templates window 320. The user interface 300 may also include a set of command buttons 322 for entries selected in the job templates window 320.

The user interface 300 may also include a jobs window 324. The jobs window 324 may show status indicators for command sets, tasks, group tasks, and jobs that are running, pending, or have been run. A kill job button 326 associated with the jobs window 324 may allow the user to stop a running or pending job that is selected in the jobs window 324. The use of command sets, tasks, group tasks, and jobs allows the user to test many media devices without the need for the user to manually provide commands used to test the media devices by the repeated use of a remote control device.

Figure 4:
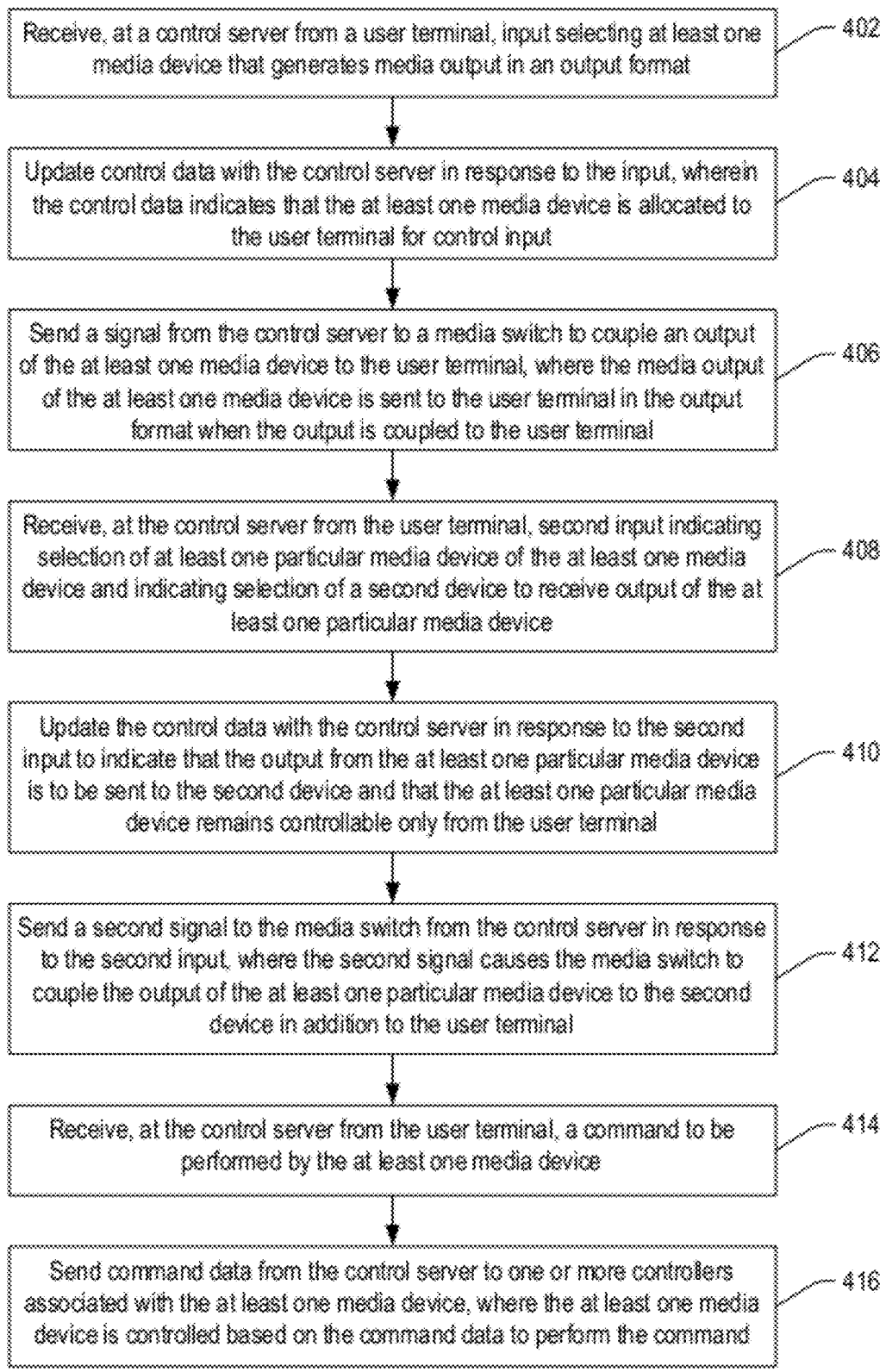
FIG. 4 is a flow chart of a first particular embodiment of a method to test media devices.

Referring to FIG. 4, a flow chart of a first particular embodiment of a method to test media devices is shown. The method may be performed by the system 100 depicted in FIG. 1.

At 402, input selecting at least one media device that generates media output in an output format may be received at a control server from a user terminal. The at least one media device may be selected from a list presented to the user terminal. The list may include identifiers of media devices electrically coupled to a test facility. The identifiers may include a unique identifier for each media device, a name for each media device, a station in the test facility where each media device is located, or combinations thereof. A particular media device electrically coupled to the test facility and assigned for control to another user terminal may not be selectable from the list.

At 404, the control server may update control data in response to the input. The control data may be stored at the control server or in a different location. The control data may indicate that each media device of the at least one media device is allocated to the user terminal for control input and that the user terminal is to receive an output of the at least one media device. For each media device of the at least one media device, the control data may include an identifier of the media device (e.g., a network address of the media device, a Media Access Control (MAC) address of the media device, or other unique identifier) and a station location in the test facility. The station location may associate the media device with a network address of a particular controller of one or more controllers and a port number of the particular controller. A particular control signal output device (e.g., an infrared transmitter) may be coupled to the port corresponding to the port number.

A signal may be sent from the control server to a media switch to couple the output of the at least one media device to the user terminal, at 406. The media output of the at least one media device may be sent to the user terminal in the output format when the output is coupled to the user terminal. For example, the media output of the at least one media device may be sent to the user terminal as composite video.

At 408, second input indicating selection of at least one particular media device of the at least one media device and indicating selection of a second device to receive the output of the at least one particular media device may be received at the control server from the user terminal. The control server may update the control data in response to the second input to indicate that the output from the at least one particular media device is to be sent to the second device and that the at least one particular media device remains controllable only from the user terminal, at 410. Also in response to the second input, the control server may send a second signal to the media switch, at 412. The second signal may cause the media switch to couple the output of the at least one particular media device to the second device in addition to the user terminal.

A command to be performed by the at least one media device may be received at the control server from the user terminal, at 414. The control server may send command data to one or more controllers associated with the at least one media device, at 416. The at least one media device may be controlled based on the command data to perform the command. Each media device of the at least one media device may receive a transmission from an appropriate control signal output device to enable the at least one media device to perform the command. The appropriate control signal output device or appropriate control signal output devices may be identified by the control server based on the control data.

Figure 5:
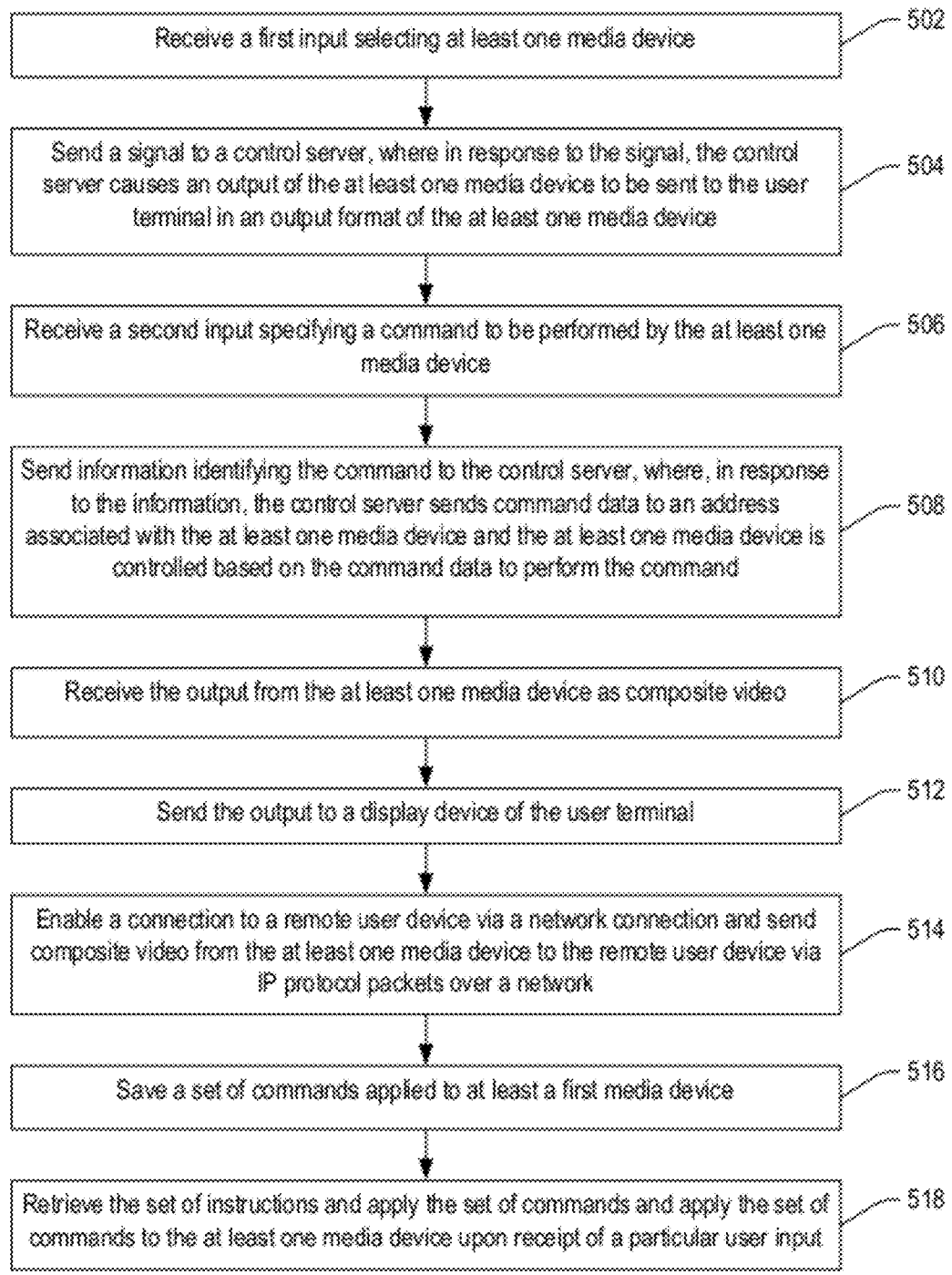
FIG. 5 is a flow chart of a second particular embodiment of a method to test media devices.

Referring to FIG. 5, a flow chart of a first particular embodiment of a method to test media devices is shown. The method may be performed by the system 100 depicted in FIG. 1.

A first input selecting at least one media device may be received at a user terminal, at 502. The at least one media device may be selected from a list presented to the user terminal. The list may include identifiers of media devices electrically coupled to a test facility. The identifiers may include a unique identifier for each media device, a name for each media device, a station in the test facility where each media device is located, or combinations thereof. A particular media device electrically coupled to the test facility and assigned for control to another user terminal may not be selectable from the list.

The user terminal may send a signal to a control server in response to the first input, at 504. The control server may cause an output of the at least one media device to be sent to the user terminal in an output format of the at least one device in response to the signal.

A second input specifying a command to be performed by the at least one media device may be received at the user terminal, at 506. The use terminal may send information identifying the command to the control server, at 508. In response to the information, the control server may send command data to an address associated with the at least one media device. The at least one media device may be controlled based on the command data to perform the command.

The user terminal may receive the output from the at least one media device as composite video, at 510. The output may be sent to a display device coupled to the user terminal, at 512. The display device may present the output as thumbnail views of media output from each media device of the at least one media device (e.g., as shown in FIG. 2). The user may be able to select a particular media output to show only the particular media output using one or more input devices of the user terminal. The user may also be able to return to the thumbnail view using the one or more input devices.

The user terminal may enable a connection to a remote user device via a network connection, at 514. The user terminal may second composite video from the at least one media device to the remote user device via Internet Protocol (IP) packets over the network. The user terminal may receive the set of commands applied to at least the first media device, the first input, the second input, or combinations thereof from the remote user device.

At 516, the set of commands applied to at least the first media device may be saved. The set of commands may be saved in a memory of the user terminal.

The user terminal may retrieve the set of commands applied to at least the first media device, at 518. The set of commands may be retrieved from a memory of the user terminal or from another location accessible to the user terminal. The user terminal may apply the set of commands to one or more media devices upon receipt of a particular user input.

The testing system disclosed enables a user to test a set of media devices located in a test facility. The user may use a user terminal to choose the set of media devices to test. Output for the set of media devices may be provided by a media switch to the user terminal for display on a display device. The media switch may provide a video portion of the output to the user terminal as composite video to replicate how a consumer using the media device would receive the output. The output may be displayed on the display device coupled to the user terminal as an array of media outputs from the corresponding media devices. Displaying the output as the array may eliminate the need for a separate display device to be coupled to each media device being tested. The user may enter one or more commands for the set of media devices at the user terminal. The testing system allows the commands to be converted to infrared (IR) commands that are transmitted to the set of media devices. Transmitting the IR commands to the set of media devices simulates viewers using remote control devices to control the media devices. Commands for testing media devices may be saved as command sets, tasks, task groups, and jobs so that the user may test one or more media devices by executing a previously saved grouping of commands instead of having to manually enter the commands needed to test the one or more media devices.

Figure 6:
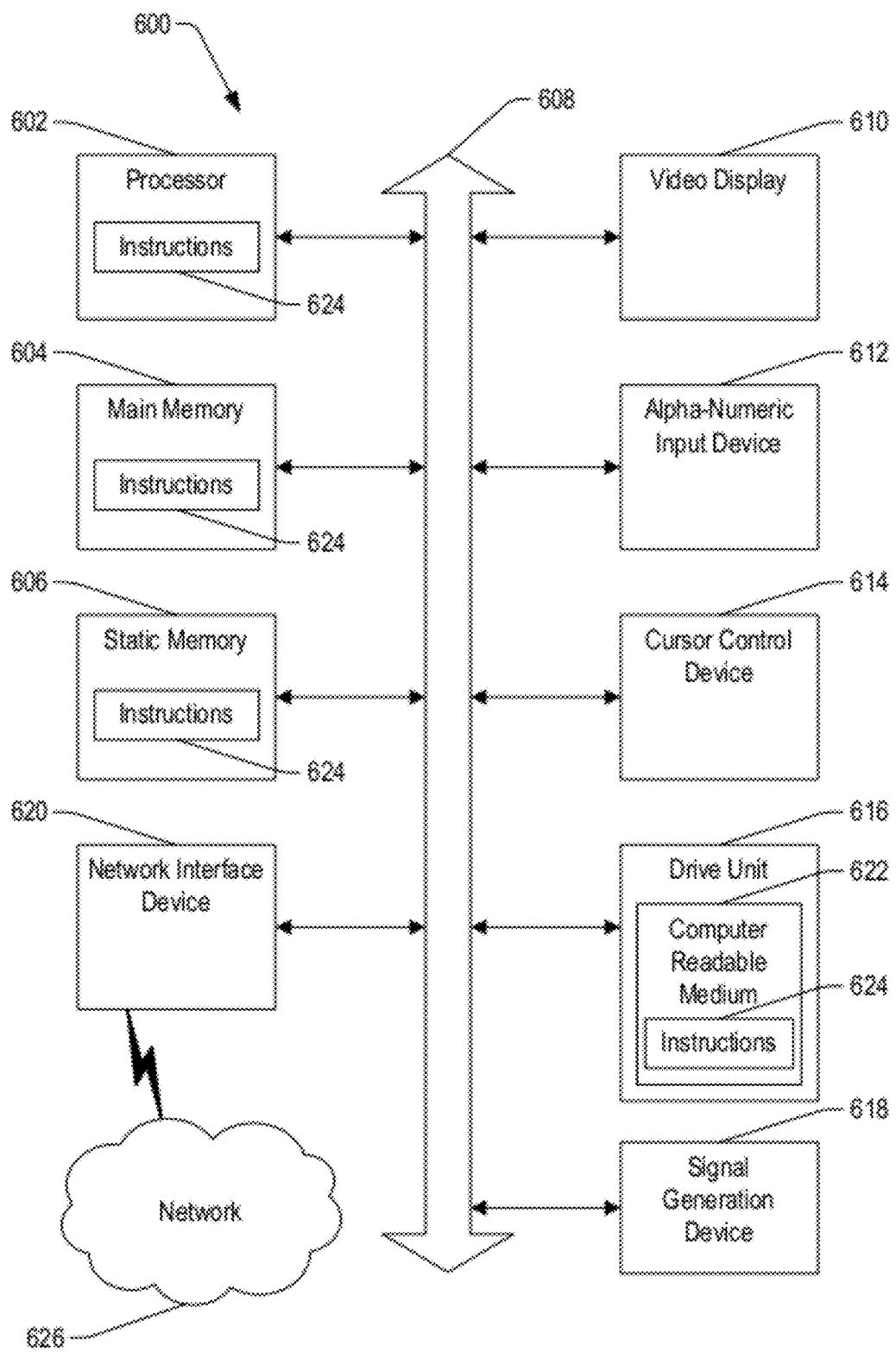
FIG. 6 is a block diagram of an illustrative embodiment of a general computer system.

Referring to FIG. 6, an illustrative embodiment of a general computer system is shown and is designated 600. The computer system 600 may include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the media devices 102-108, the user terminal 114, the user terminal 116, the control server 118, the media switch 120, the controllers 122, and the remote user device 134 described with reference to FIG. 1.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 may include a main memory 604 and a static memory 606, which can communicate with each other via a bus 608. As shown, the computer system 600 may further include a video display unit 610, such as a liquid crystal display (LCD), a projection television system, a flat panel display, or a solid state display. Additionally, the computer system 600 may include an input device 612, such as a keyboard, and a cursor control device 614, such as a mouse. The computer system 600 may also include a disk drive unit 616, a signal generation device 618, such as a speaker or remote control, and a network interface device 620. Some computer systems 600 may not include an input device (e.g., a server may not include an input device).

In a particular embodiment, as depicted in FIG. 6, the disk drive unit 616 may include a non-transitory computer-readable storage medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include non-transitory computer-readable storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a non-transitory computer-readable storage medium 622 that stores instructions 624 or receives, stores and executes instructions 624, so that a device connected to a network 626 may communicate voice, video or data over the network 626. Further, the instructions 624 may be transmitted or received over the network 626 via the network interface device 620.

While the non-transitory computer-readable storage medium is shown to be a single medium, the term "non-transitory computer-readable medium" includes a single medium or multiple media, such as a centralized or distributed database, and/or associated caches and servers that store one or more sets of instructions. The term "non-transitory computer-readable medium" shall also include any medium that is capable of storing or encoding a set of instructions for execution by a processor or that cause a computer system to perform any one or more of the methods or operations disclosed herein.

In a particular non-limiting, exemplary embodiment, the non-transitory computer-readable storage medium may include a solid-state memory such as a memory card or other package that houses one or more non-volatile read-only memories. Further, the non-transitory computer-readable storage medium may be a random access memory or other volatile re-writable memory. Additionally, the non-transitory computer-readable storage medium may include a magneto-optical or optical medium, such as a disk or tapes or other storage device. Accordingly, the disclosure is considered to include any one or more of a non-transitory computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    receiving, at a control server from a first terminal, first input selecting a first media device and a second media device coupled to a media switch;
    updating control data to generate updated control data in response to the first input, wherein the updated control data includes an identifier of the first media device and associates the first media device with a particular station location of a test facility, the particular station location associated with a particular controller;
    sending a signal from the control server to the media switch to send a first video output of the first media device and a second video output of the second media device to the first terminal;
    receiving, at the control server from the first terminal, second input identifying a command to be performed by the first media device; and
    sending, via the particular controller based on the updated control data, command data corresponding to the command from the control server to the first media device to instruct the first media device to perform the command.

2. The method of claim 1, wherein the first video output and the second video output are received from the media switch as composite video.

3. The method of claim 1, wherein the particular station location is associated with a network address of the particular controller, a port number of the particular controller, or a combination thereof.

4. The method of claim 3, wherein the port number of the particular controller is associated with a particular control signal output device.

5. The method of claim 4, wherein the particular control signal output device comprises an infrared transmitter.

6. The method of claim 1, further comprising:
    receiving third input from the first terminal indicating selection of the first media device and indicating selection of a second terminal to receive the first video output of the first media device; and
    sending a second signal to the media switch in response to the third input to send the first video output of the first media device to the second terminal.

7. The method of claim 6, further comprising updating the updated control data in response to the third input to indicate that the first video output from the first media device is to be sent to the second terminal and that the first media device is controllable from the first terminal but not from the second terminal.

8. The method of claim 1, further comprising, in response to a third input from the first terminal, further updating the updated control data to indicate that the first video output from the first media device is to be sent to a second terminal and that the first media device is controllable from the first terminal but not from the second terminal.

9. The method of claim 1, wherein the command includes a command to power on the first media device, a command to power off the first media device, a channel change request, a menu selection, a command to access particular media content, a command to change a playback property of media content played by the first media device, a command to record media content, or a command to start an application.

10. The method of claim 1, wherein the control server enables the first terminal to control a plurality of media devices in response to a single user input.

11. The method of claim 1, wherein the updated control data indicates that the first media device and the second media device are allocated to receive control input from the first terminal, and further comprising:
    receiving third input from the first terminal to release the first media device; and
    updating the updated control data in response to the third input to indicate that the first media device is no longer allocated to receive control input from the first terminal.

12. A server, comprising:
    a processor;
    a memory accessible to the processor, the memory comprising instructions executable by the processor to perform operations comprising:
        receiving, from a terminal, first input selecting a first media device and a second media device coupled to a media switch;
        updating control data to generate updated control data in response to the first input, wherein the updated control data includes an identifier of the first media device and associates the first media device with a particular station location of a test facility, the particular station location associated with a particular controller;
        sending a signal to the media switch to send a first video output of the first media device and a second video output of the second media device to the terminal;
        receiving the first video output of the first media device and the second video output of the second media device from the media switch;
        sending a user interface including the first video output and the second video output to a display device;

receiving, from the terminal, second input specifying a command to be performed by the first media device; and sending, via the particular controller based on the updated control data, command data corresponding to the command to the first media device to instruct the first media device to perform the command.

13. The server of claim 12, wherein the first video output and the second video output are received from the media switch as composite video.

14. The server of claim 12, wherein the operations further comprise establishing a connection to a remote device via a network.

15. The server of claim 14, wherein the operations further comprise sending the first video output and the second video output to the remote device as internet protocol data.

16. The server of claim 12, wherein the operations further comprise:
   saving a set of commands applied to the first media device;
   retrieving the set of commands; and
   applying the set of commands to the second media device in response to receiving third input.

17. The server of claim 12, wherein the operations further comprise:
   receiving a first audio output of the first media device and a second audio output of the second media device;
   receiving an audio output selection indicating the first media device; and
   in response to the audio output selection, sending the first audio output of the first media device to an audio output device.

18. A computer-readable storage device storing instructions, that when executed by a processor, cause the processor to perform operations comprising:
   receiving, from a terminal, first input selecting a first media device and a second media device coupled to a media switch;
   updating control data to generate updated control data in response to the first input, wherein the updated control data includes an identifier of the first media device and associates the first media device with a particular station location of a test facility, the particular station location associated with a particular controller;
   sending a signal to the media switch to send a first video output of the first media device and a second video output of the second media device to the terminal;
   receiving, from the terminal, second input identifying a command to be performed by the first media device; and
   sending, via the particular controller, command data corresponding to the command to an address associated with the first media device to cause the first media device to perform the command.

19. The computer-readable storage device of claim 18, wherein the media switch comprises a multiplexer configured to direct the first video output and the second video output based on the signal.

20. The computer-readable storage device of claim 18, wherein a port number of the particular controller is associated with a particular control signal output device.

* * * * *